United States Patent [19]

Rubel

[11] 4,258,813

[45] Mar. 31, 1981

[54] APPARATUS FOR AUTOMATIC GUIDANCE OF A TRACKLESS VEHICLE

[75] Inventor: Erich Rubel, Ludwigsburg, Fed. Rep. of Germany

[73] Assignee: Robert Bosch GmbH, Stuttgart, Fed. Rep. of Germany

[21] Appl. No.: 962,393

[22] Filed: Nov. 20, 1978

[30] Foreign Application Priority Data

Nov. 22, 1977 [DE] Fed. Rep. of Germany ....... 2752027

[51] Int. Cl.$^3$ .............................................. B62D 1/24
[52] U.S. Cl. ..................................... 180/168; 318/587
[58] Field of Search ....................... 180/167, 168, 79.1; 318/587, 580

[56] References Cited

U.S. PATENT DOCUMENTS 3,614,990 10/1971 Schnitzler ............................ 180/168
3,768,586 10/1973 Thompson et al. .................. 180/168

FOREIGN PATENT DOCUMENTS 2328863 1/1975 Fed. Rep. of Germany .

Primary Examiner—John J. Love
Assistant Examiner—Donald W. Underwood
Attorney, Agent, or Firm—Frishauf, Holtz, Goodman & Woodward

[57] ABSTRACT

In order to permit digital processing of the alternating signals induced in a pair of perpendicular detecting coils mounted on a trackless vehicle which is guided over a buried guide cable carrying alternating current, one of the induced signals is phase shifted and applied to one input of a comparator whose other input receives the other signal. At the same time, the other signal is also fed to a comparator which produces a rectangular output signal in phase with the original signal. The outputs of the two comparators are fed to a microprocessor which generates an error signal related to the time interval between the occurrence of periodic features of the two input signals. The error signal is used to engage the steering gear of the vehicle to return it to its path over the guide cable. In further embodiments, the frequency of the input signals is lowered to facilitate digital processing and a separate counter is used to uncouple the microprocessor from the detection apparatus, permitting it to process the data at a lower frequency of operation.

10 Claims, 7 Drawing Figures

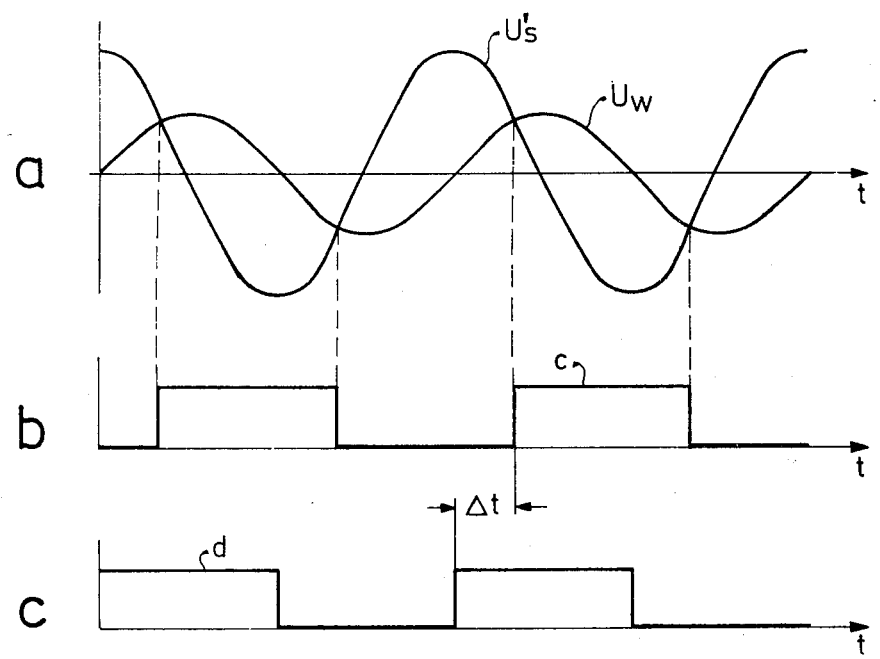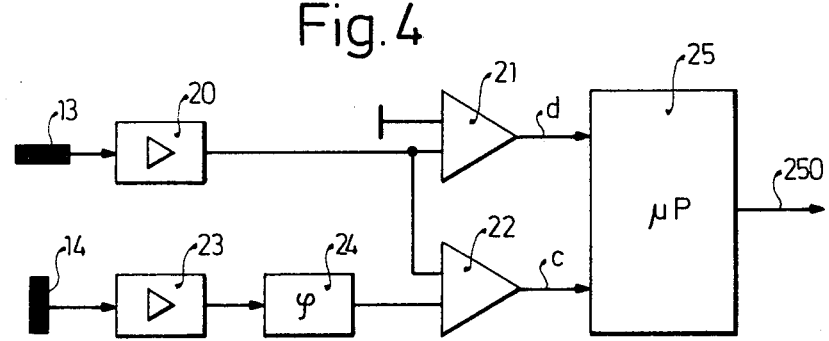

APPARATUS FOR AUTOMATIC GUIDANCE OF A TRACKLESS VEHICLE

FIELD OF THE INVENTION

The invention relates to the automatic guiding of a trackless vehicle along a guide wire buried in the road surface. The wire conducts an alternating current and generates around itself an electromagnetic field which may be sensed by suitable devices in the vehicle. The local electromagnetic field contains information regarding the lateral separation of the vehicle from the wire and this information may be used to steer the vehicle so as to track the buried wire.

BACKGROUND OF THE INVENTION

In a known apparatus described in the German Offenlegungsschrift No. 2 328 863, the local magnetic field is detected by a pair of perpendicular coils in which the varying magnetic field induces electrical voltages which become a measure of the distance of the coils and of the vehicle from the guide cable. These signals are processed in an electrical controller and finally become the error signal which is fed to a hydraulic final control element that causes the front wheels to be steered toward the cable so that the vehicle continues to track it. In the known apparatus, one coil is disposed vertically and the other horizontally and the voltages induced in the coils, when normalized, correspond to the following functions.

Vertical signal: $\bar{U}s = \cos\alpha \cdot \sin\alpha \cdot \sin\omega t$ and
Horizontal signal: $\bar{U}w = \cos^2\alpha \cdot \sin\omega t$ By forming the quotient Us/Us, one gets the linear function $U = a/h$ wherein $\alpha = \arctan a/h$, where $h = \text{constant}$, and the function U then becomes a measure of the deviation a of the vehicle from the ideal location defined by the guide cable.

It is a disadvantage of the known apparatus that the deviation of the vehicle from the proper track is represented as an analog signal and thus is not directly suitable for further processing in a digital computer circuit, for example in a microprocessor.

THE INVENTION

It is an object to provide an apparatus for guiding a trackless vehicle on the basis of deviation from a buried guide cable but in which the signal defining the deviation from the guide cable is in the form of a time interval which may be used directly by a digital computing circuit to generate an output signal by count-down. Briefly, the phase of the signal from one of the coils is rotated the difference between the phase of the rotated signal and the phase of the energizing signal in the cable, e.g. the signal in the other of the two coils, is then detected, thereby deriving a comparison which is available in form of a pulse signal which defines time intervals. This pulse signal is used to generate an error signal for a final control element associated with the steering gear of the vehicle.

In one feature of the invention, one of the coils is coupled to one input of a first comparator whose second input receives a fixed voltage while the first coil is further coupled to one input of a second comparator whose second input receives the output of a phase shifter whose input is the signal from the second detecting coil. The output of the two comparators are then fed to inputs of a computing circuit.

In yet another feature of the invention, the output signals of the two detecting coils are converted to a lower intermediate frequency, preferably by sampling. In this way, it is possible to use counting circuits having relatively low counting rates. The normal guide cable frequency is of the order of approximately 10 kHz, so that a very high counting rate of the computer circuit is required to attain sufficient resolution of the error signal if no frequency reduction is made.

In a further preferred embodiment of the invention, the deviation signal is counted in a separate counter which is not part of the computer circuit and the counting process starts with the onset of the previously computed time interval while the counter contents obtained at the end of the timing interval are transmitted to a buffer which may be read out at any time by the computing circuit. In this manner, the inherent counting rate of the computer does not limit the signal frequency of the guide cable. A particularly effective feature is that during the counting interval, the pulses of an adjustable reference oscillator are counted and the reference oscillator frequency is phase-locked to the guide cable frequency.

Further details and advantages will emerge from the following detailed description of several preferred embodiments as illustrated in the drawing.

BRIEF DESCRIPTION OF THE DRAWING

FIG. 3 is a diagram illustrating the various voltages occurring in the detecting coils and comparator output signals which are related to these voltages;

FIG. 4 is a block diagram of a first embodiment of the invention;

DETAILED DESCRIPTION OF THE INVENTION

Figure 1:
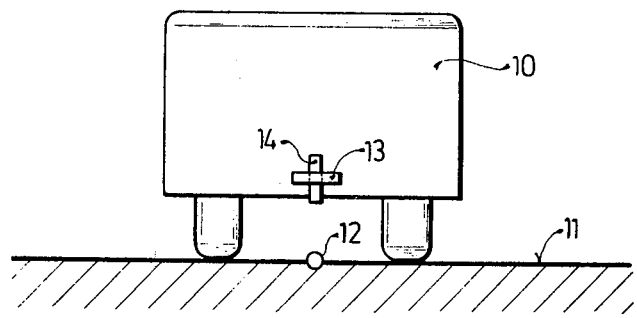
FIG. 1 is a schematic diagram of the front or rear of a trackless vehicle being guided over a guide cable.

FIG. 1 is a trackless vehicle seen from the front or rear following the proper track over a road surface 11 as defined by a buried guide cable 12. Mounted on the vehicle are two detecting coils, a horizontally disposed coil 13 and a vertically disposed coil 14. The terms vertical and horizontal define the direction of the axis of the coil or its core. The guide cable 12 carries an alternating current which, when undisturbed, generates an electromagnetic field having circular magnetic field lines which generate in the coils 13 and 14 voltages that may be used for adjusting the track of the vehicle to follow the buried cable.

Figure 2:
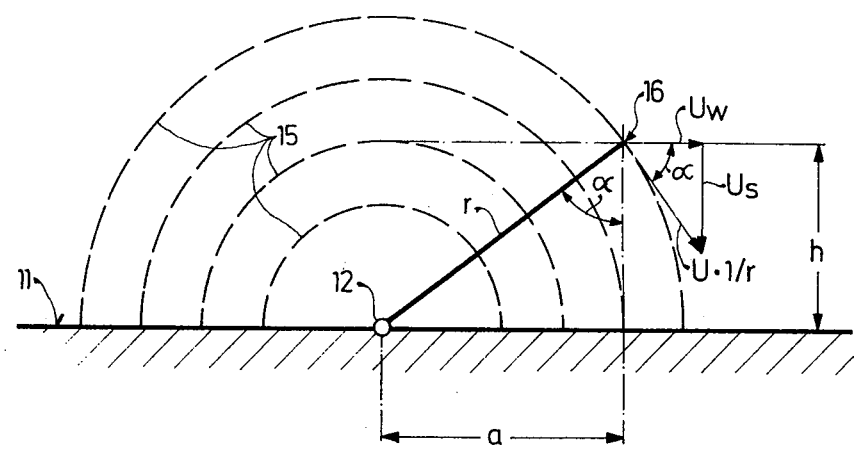
FIG. 2 is a diagram illustrating the field lines and the voltage vectors in the electromagnetic field due to a guide cable which carries alternating current.

The manner in which the trackless vehicle 10 is guided over the cable will now be discussed with reference to FIG. 2. The dashed lines in FIG. 2 are intended to represent the magnetic field lines representing the magnetic field 15. These field lines are intended to represent the case where the vicinity of the cable 12 is free of ferromagnetic objects and other current carriers which would distort the circular cross section of the field lines. The location of the detector coils for the purpose of the illustration of FIG. 2 is assumed to be at the point 16, i.e., the vehicle 10 has deviated from the proper track defined by the cable 12. The dimensions of the coils 13, 14 are aasumed to be negligible for the present discussion, i.e., the distance r between the point 16 and the guide cable 12 is assumed to be substantially greater than the dimensions of the coil so that the field is assumed to be homogeneous over the dimensions of the coils. The height of the two coils above the roadway 11 is designated as h and may be, for example, 20 to 30 cm. The distance of the coils from the guide cable 12 in the plane of the roadway, i.e., the lateral distance in the horizontal plane is labeled a. The angle between a perpendicular line at the point 16 and the vector r between the point 16 and the guide cable 12 is labeled $\alpha$. In the following discussion, a quantity $\overline{U}=1$ will be assumed to be the normalized voltage proportional to the voltage U which obtains at the height h in a horizontal detecting coil 13 exactly above the guide cable 12. This voltage decreases as a function of the distance r in the ratio 1:r. Accordingly, the voltage induced in a coil tangent to the field line at the point 16 is $U \cdot 1/r$. When this voltage is resolved into vertical and horizontal components according to the disposition of the vertical and horizontal coils 14 and 13, respectively, one obtains:

$$U_s = (U/r) \sin \alpha \sin \omega t$$

$$U_w = (U/r) \cos \alpha \sin \omega t$$

and since $$\cos \alpha = (h/r) \text{ or } (1/r) = (\cos \alpha / h)$$

therefore:

$$\overline{U}_s = (U/h) \sin \alpha \cdot \cos \alpha \cdot \sin \omega t$$

$$\overline{U}_w = (U/h) \cos^2 \alpha \cdot \sin \omega t,$$

which, when normalized, becomes $$U_s = \sin \alpha \cdot \cos \alpha \cdot \sin \omega t$$

$$U_w = \cos^2 \alpha \cdot \sin \omega t.$$

In what follows, the voltage $U_w$ will designate the voltage induced in the horizontal coil 13 while the voltage $U_s$ will define the voltage induced in the vertical coil 14.

It is a principal feature of the present invention to provide a phase-shifting circuit which electrically rotates the voltage $U_s$ by 90°, for example in a known integrating circuit. The expressions for the vertical and horizontal voltages then become $$U_s' = \cos \alpha \sin \alpha \cdot \cos \omega t$$

$$U_w = \cos^2 \alpha \sin \omega t$$

The voltages $U_s'$ and $U_w$ are illustrated in FIG. 3a. If these two voltages are applied to complementary inputs of a comparator, a square wave is generated having a duty cycle of 50 percent, i.e., a symmetric wave train c illustrated in FIG. 3b. The comparator switches over when the two voltages are equal, i.e., when $$U_w = U_s'$$

i.e., when $$\cos^2 \alpha \cdot \sin \omega t = \cos \alpha \cdot \sin \alpha \cdot \cos \omega t$$

$$\frac{\sin \omega t}{\cos \omega t} = \frac{\sin \alpha}{\cos \alpha}$$

$$\omega t = \alpha$$

Accordingly, the phase shift of the voltage $U_w$ with respect to the pulse train c is equal to the angle $\alpha$. If a second rectangular pulse train d is generated as illustrated in FIG. 3c, that pulse train will be representative of the sign of the voltage $U_w$ and the pulse trains c and d also have a relative phase shift of $\alpha$, i.e. equal to the time interval $\Delta t$ between two positive or negative going edges of the pulse trains c and d.

The signals represented in FIG. 3 may all be generated with an apparatus illustrated as a first embodiment of the invention in FIG. 4. Shown there is the horizontal coil 13 connected via an amplifier 20 to the input of the first comparator 21. The second input is connected to ground or a fixed reference voltage and the output of the amplifier 20 is also connected to the input of a second comparator 22. The vertical coil 14 is connected via an amplifier 23 to a phase-shifting circuit 24 whose output goes to the second input of the second comparator 22. Accordingly, the output of the first comparator 21 is the pulse train d and the output of the second comparator 22 is the pulse train c. These two pulse trains are then applied to appropriate inputs of a computer circuit 25, preferably a microprocessor of known construction, which defines the magnitude of the time interval between complementary edges of the pulse trains c and d by count-down of a counter 25c (FIG. 5) and which generates an error signal representative of the deviation of the vehicle 10 from the proper track as defined by the guide cable 12. The error signal is passed through an output 25o to the steering gear of the vehicle 10, via suitable intermediate and known devices.

If the frequency of the current in the guide cable is for example 10 kHz and if the effective region of measurement ranges for values of $\alpha$ from $+80°$ to $-80°$, the resolution in an 8-bit processor will be approximately $1.7 \times 10^{-7}$ sec/bit. This corresponds to a counting rate or clock rate, determined by clock 25t (FIG. 5) of approximately 5.8 MHz. If it is intended to use a microprocessor with a lower counting rate, it is necessary to reduce the guide cable frequency.

Figure 5:
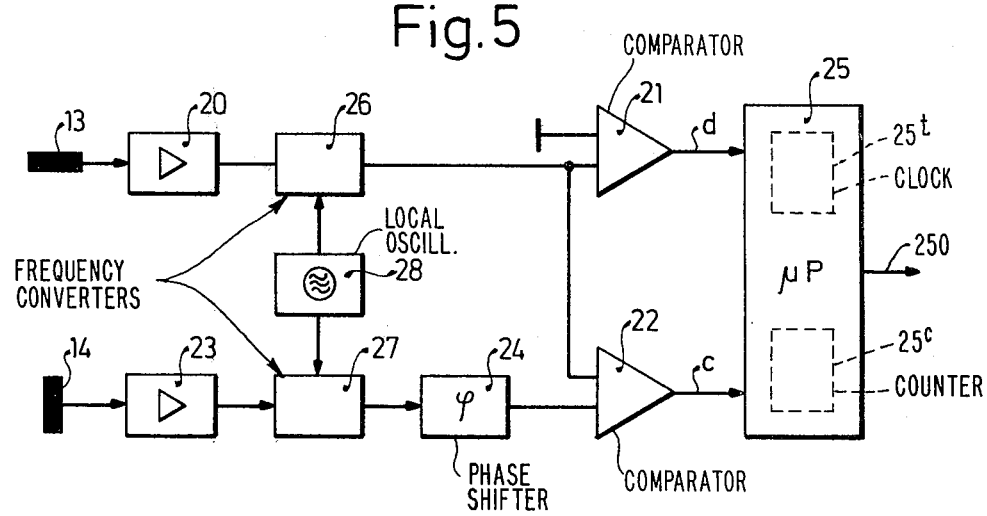
FIG. 5 is a schematic block diagram of a second embodiment of the invention.
Figure 6:
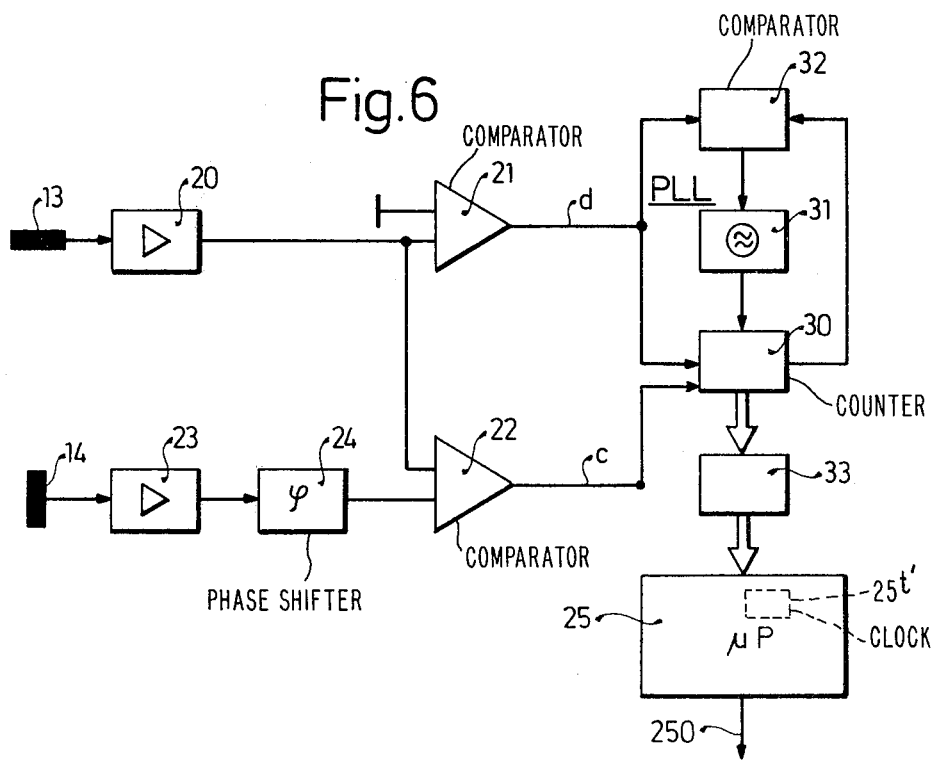
FIG. 6 is a block diagram of a third exemplary embodiment of the invention.

FIG. 5 is a block diagram of a second embodiment of the invention with provisions for reducing the frequencies used by the microprocessor. Shown here is a pair of frequency converters 26, 27, e.g. RCA CA3060 to frequency convert the carrier frequency included by cable 12, and respectively connected behind the amplifiers 20 and 23. The converters are controlled by a local oscillator 28. The outputs of the converters 26, 27 are connected, in consonance with the embodiment of FIG. 4, to appropriate inputs of the comparators 21, 22 and the phase-shifting circuit 24. The converters 26, 27 may be known devices which permit phase-coherent conversion, for example according to the sampling process. When the guide cable frequency is 10 kHz and the local oscillator frequency is, for example, 9.75 kHz, the output frequency of the converters 26, 27 will be 250 Hz, requiring the counting rate of the computer 25 to be only 144 kHz. The computer 25 has a local clock oscillator 25*t* and a counter 25*c* to provide a digital output signal, at the clock rate representative of the interval Δt (FIG. 3, graph c).

In a third exemplary embodiment of the invention, the count-down of the time interval between complementary edges of the pulse trains c and d takes place in an external counter. In this embodiment, the output of the first comparator 21 is fed to the input of a counter 30 which counts the pulses from a reference oscillator 31. The output of the counter 30 and the output of the first comparator are fed to a phase comparator 32 which generates a control signal for a variable reference oscillator 31. The digital data output of the counter 30 goes to a buffer memory 33. The transfer input for counter 30 is the output signal of the comparator 22. During cycles which are determined by the pulse train d, the counter 30 counts the pulses from the variable reference oscillator whose frequency stands in a fixed ratio to that of the pulse train d. Its frequency ratio is held constant by the phase locked loop including the phase comparator 32 e.g. SGS HBF 4046. By means of the phase locked loop, the counter 30 receives a definite number of output pulses of the reference oscillator 31 for each period of the pulse train d, for example 256 pulses for each half period of the pulse train d. The occurrence of the switching edges of the pulse train c from the output of the second comparator 22 causes the instantaneous contents of the counter 30 to be transferred to the buffer memory 33 from which the computer circuit 25 may read it out any desired time. In this manner, the clock frequency of the computer clock circuit 25*t'* is independent of the other apparatus because the measured data is present at all times in the buffer 33.

The above-described embodiments of the invention are considered to be only exemplary and features of one embodiment may be used in another as well as variants of the invention provided without thereby desparting from its spirit and scope.

Figure 7:
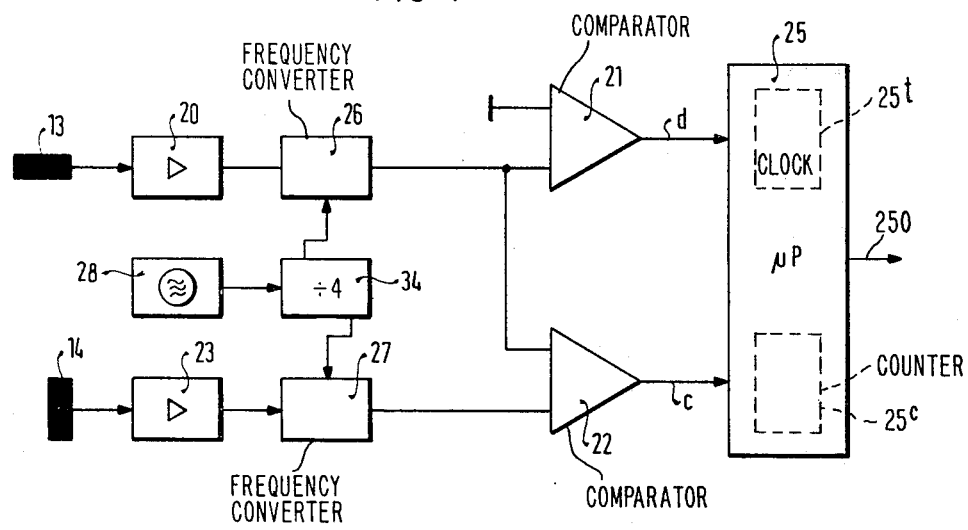
FIG. 7 is a block diagram of a fourth exemplary embodiment of the invention.

FIG. 7 is a block diagram of a fourth embodiment of the invention with provision for reducing the frequencies used by the microprocessor. Shown here is a pair of frequency converters 26, 27, respectively connected behind the amplifiers 20 and 23. The converters 26, 27 are driven by sampling pulses of the pulse forming stage 34 which is connected to the local oscillator 28. The output signal of the local oscillator 28 has a fourfold frequency relative to the frequency of the sampling pulses at the outputs of the pulse forming stage 34. For the purpose of phase shifting the pulse forming stage, which contains a decade counter e.g. SGS #BF 401.7, is fed, by the local oscillator 28. The counter operates as a ¼ divider. The pulses at the four outputs have a frequency which is ¼ of the counter's input frequency. Neighboring outputs of the counter offer pulses with a phase difference of 90°. Due to the phase shifting of the sampling pulses the output signals of the converters 26, 27 are also phase shifted. The phase shifting circuit 24 then is not necessary.

I claim:

1. An apparatus for guiding a trackless vehicle along a path defined by a guide cable disposed in the road surface, said guide cable carrying an alternating current, thereby generating an alternating electromagnetic field in the space surrounding the guide cable, said apparatus having detector means for detecting the direction and magnitude of the alternating magnetic field, said detector means including a first detecting coil (13) disposed substantially horizontally on said vehicle and a second detecting coil (14) disposed substantially perpendicular to said first detecting coil, for generating from the alternating magnetic field first and second alternating signals, respectively, and comprising, in accordance with the invention, phase shifting means (24) connected to the second detecting coil (14) and receiving the second signal to shift the phase of said second signal and thereby form a third signal;

and computer means (21, 22; 25) connected to the first coil for receiving said first signal and to the phase shifting means (24) for receiving the third signal, said computer means including clock means (25t; 31, 25t') and comparator means (21, 22) comparing the relative phase of the first signal representative of the phase of the alternating magnetic field with the phase of the third signal, said computer deriving a digital error signal as a function of the phase difference between the first and third signals to thereby obtain a control signal to steer said vehicle in the sense of reducing the phase difference between the first and third signals, resulting in guiding said vehicle (10) in a path over said guide cable (12).

2. Apparatus according to claim 1, wherein the comparator means comprises a first comparator (21) having first and second inputs, the first input of said first comparator (21) being connected to said first detecting coil (13) to receive therefrom said first signal and the second input of said first comparator (21) being connected to a source of a fixed reference potential;

and a second comparator (22) having first and second inputs, said first input of said second comparator being also connected to said first detecting coil (13) and said second input of said second comparator (22) being connected to the output of the phase shifting means (24) which is connected to said second coil (14).

3. Apparatus according to claim 2, wherein the computer means includes signal processor means (25) connected to and controlled by the outputs of said first and second comparators (21, 22) to generate said digital error signal representative of said phase difference.

4. Apparatus according to claim 1, further comprising frequency conversion means (26, 27, 28), coupled to the outputs of said first and second detecting coils (13, 14) for generating from said alternating first and second signals corresponding signals at a lower frequency.

5. Apparatus according to claim 4, wherein said frequency conversion means generates a lower frequency by sampling.

6. Apparatus according to claim 2, further comprising a reference oscillator (31);

a phase comparator (32);

and a digital counter (30) connected with the reference oscillator and the phase comparator in a phase-locked loop, the digital counter being connected to be reset by the first comparator (21) for counting pulses generated by the reference oscillator (31), the frequency of the reference oscillator being controlled in the phase-locked loop to maintain a fixed ratio to the frequency of the output signal from said first comparator;

said counter (30) being further connected to and controlled by the output from the second comparator, comparing said first and third signals to control read-out of the counter and providing said digital error signal as a function of the count state of the counter and hence of the pulses furnished from the reference oscillator (31) upon non-coincidence of a signal characteristic of the first and third signals.

7. Apparatus according to claim 6, further comprising a buffer circuit (33) to receive the contents of said digital counter;

and a digital processor forming parts of said computer means (25) connected to the output of said buffer circuit (33) to perform digital processing of the contents of said buffer, and hence of the read-out of the counter at a rate independent of the frequency of said first and second signals.

8. Apparatus according to claim 1, further comprising frequency conversion means (26, 27, 28, 34);

and wherein said phase shifting means form part of the frequency shifting means.

9. Apparatus according to claim 8, wherein the frequency conversion means includes a pulse forming state (34) having a plurality of outputs and producing relatively phase shifting sampling pulses at said respective outputs.

10. Apparatus according to claim 9, wherein said pulse forming stage (34) comprises a 1:4 divider, including a counter, to provide 90° phase-shifted outputs at respective terminals of the divider.

* * * * *